United States Patent
Abbott et al.

(10) Patent No.: US 11,899,407 B2
(45) Date of Patent: Feb. 13, 2024

(54) REAL TIME CLOCK INTEGRATED MODULE AND DEVICE IMPLEMENTING SUCH A MODULE

(71) Applicant: OROLIA DEFENSE & SECURITY LLC, Rochester, NY (US)

(72) Inventors: Brent Abbott, New York, NY (US); Hervé Echelard, Bures sur Yvette (FR); Paul Edward Myers, New York, NY (US)

(73) Assignee: OROLIA DEFENSE & SECURITY LLC, Rochester, NY (US)

( * ) Notice: Subject to any disclaimer, the term of this patent is extended or adjusted under 35 U.S.C. 154(b) by 0 days.

(21) Appl. No.: 17/876,725

(22) Filed: Jul. 29, 2022

(65) Prior Publication Data
US 2023/0039814 A1 Feb. 9, 2023

(30) Foreign Application Priority Data

Aug. 4, 2021 (EP) ..................................... 21189684

(51) Int. Cl.
*G04F 5/14* (2006.01)
(52) U.S. Cl.
CPC ..................................... *G04F 5/14* (2013.01)
(58) Field of Classification Search
CPC .......................................................... G04F 5/14
USPC ...................................................... 331/94.1
See application file for complete search history.

(56) References Cited

U.S. PATENT DOCUMENTS

| | | |
|---|---|---|
| 2016/0352344 A1 | 12/2016 | Maki |
| 2020/0119722 A1 | 4/2020 | Kamiyama |
| 2020/0125134 A1 | 4/2020 | Gorgy et al. |
| 2021/0200260 A1* | 7/2021 | Haneda ................ G04F 10/005 |
| 2021/0305829 A1* | 9/2021 | Ramirez ............... G01R 22/06 |

OTHER PUBLICATIONS

European Search Report dated Jan. 14, 2022 for corresponding European Application No. 21189684.0.0, filed Aug. 4, 2021.
Liu Zhaoqing et al., "A Universal Method for Implementing IEEE 1588 with the 1000M Ethernet Interface", 2016 IEEE Autotestcon, IEEE, Sep. 12, 2016 (Sep. 12, 2016), pp. 1-7, XP032977489.

* cited by examiner

*Primary Examiner* — Joseph Chang
(74) *Attorney, Agent, or Firm* — David D. Brush; Westman, Champlin & Koehler, P.A.

(57) ABSTRACT

A device implementing a real time clock integrated module for outputting data indicating a time-of-day. The real time clock integrated module includes: a high-precision oscillator or atomic clock having an accuracy of 50 ppb (parts per billion) or better; a timing circuit for generating time-of-day data according to a clock signal outputted from the oscillator or atomic clock; a power source allowing the timing circuit to maintain time when the device is powered off. The timing circuit includes a real time clock and a logic device storing a timestamp. The timing circuit is configured when the device is powered off to update the timestamp value based on the oscillator or atomic clock and to generate a time reference signal and to provide to the device the updated timestamp value and the time reference signal that the device can use as a time reference once the device is powered up again.

9 Claims, 6 Drawing Sheets

Startup Date/Time Set

REAL TIME CLOCK INTEGRATED MODULE AND DEVICE IMPLEMENTING SUCH A MODULE

FIELD OF THE INVENTION

The present disclosure relates to a real time clock (RTC) integrated circuit, an electronic apparatus or device using the same and an operating method thereof.

BACKGROUND OF THE INVENTION

Most electronic products/apparatuses, such as personal computers, mobile phones, and computer servers, require accurate time measurements and include a low precision real time clock (RTC). A typical real time clock (RTC) is usually a separate device (chip) that maintains time based on an inexpensive crystal oscillator (XO).

The accuracy of this oscillator directly impacts the amount of accuracy the internal time base of the RTC will exhibit over time when not updated by an external source. The RTC can be backed by a battery source that will allow the RTC to maintain time when the device in which it is implemented is powered off. When the device is powered on again after having been off for an extended period of time (days or weeks), the time available from the RTC may not be accurate. Low-cost crystal oscillators are typically accurate to only 100K parts per billion (ppb), which will yield approximately a one-minute error after a one month off time.

However, in some applications, clocks of this type are not accurate enough and the drift can become unacceptable (i.e. out of tolerance range).

There is therefore a need for making the RTC of a device more accurate without requiring an external source (reliable clock reference) to update constantly or regularly the internal time base of the RTC.

SUMMARY OF THE INVENTION

An aspect of the present invention is to address at least the above-mentioned problems, and/or disadvantages and to provide at least the advantages described below.

Accordingly, an aspect of the present invention is to provide a real time clock (RTC) integrated circuit. Another aspect of the present invention is to provide an electronic apparatus or device using such a real-time clock.

Still another aspect of the present invention is to provide a method for managing a real-time clock embedded in a device or apparatus.

The invention provides a device implementing a real time clock integrated module for outputting data indicating a time-of-day and suitable for use in a device, said real time clock integrated module comprising:
  a high-precision oscillator or atomic clock having an accuracy of 50 ppb (parts per billion) or better,
  a timing circuit for generating the time-of-day data according to a clock signal outputted from said high-precision oscillator or atomic clock,
  a power source for allowing the timing circuit (to maintain time when the device in which it is implemented is powered off,
  said timing circuit comprising a real time clock and a logic device storing a timestamp, said timing circuit being configured when the device is powered off to update the timestamp value based on the high-precision oscillator or atomic clock and to generate a time reference signal, said timing circuit being also configured to provide to the device said updated timestamp value and said time reference signal that the device can use as a time reference to reinitialize the timing system of the device once the device is powered up again.

The invention provides a device having real time clock using digital logic (such as a low power, complex programmable logic device, a CPLD for instance) combined with an algorithm to maintain time based on a disciplined reference/precise oscillator or atomic clock. The use of a CPLD is the preferred reference implementation to minimize power consumption while providing easy to implement using programmable logic, but the invention can be implemented using an ASIC, FPGA or discrete digital logic.

The invention proposes to implement an internal RTC via digital logic and atomic clock to keep accurate time in low power standby mode and then providing time accurate PPS to system/device when system/device is fully functional. The PPS signal is used for subsecond accuracy.

In other words, the invention provides a more accurate real time clock (RTC) in the form of CPLD based RTC for instance driven by a very stable oscillator. By using more accurate time sources, i.e. higher quality oscillators such as Oven Controlled Crystal Oscillators (OCXO) or atomic clocks with 1 ppb and even 0.001 ppb accuracy, this will yield millisecond to microsecond accuracy even after one month off time. This reference oscillator may however be typically 50 parts per billion (ppb) or better.

The CPLD stores a timestamp, provided by the device in which the CPLD based RTC is implemented, and updates that timestamp based on the precise oscillator or atomic clock. The CPLD will also generate a pulse per second (PPS) signal that the device in which the CPLD based RTC is implemented can use as a time reference.

In other words, the disciplined reference oscillator or atomic clock is designed to update the timestamp through the programmable logic device (e.g. a CPLD) and to reinitialize the timing system of the device in which the CPLD based RTC is implemented with both time and PPS when requested by the timing system.

The processor unit of the device adapted to analyze the timestamp and PPS for generating a corrective value and to update the timing system of the device.

The programmable logic and very stable atomic clock or oscillator allow to keep accurate time in low power standby mode and then providing time accurate PPS to the device in which the programmable logic based RTC is implemented when the device is powered up again and is fully functional.

This accurate pulse-per-second PPS signal is thus used to maintain integrity of the device or product's time reference as well as provide a mechanism to quickly obtain and maintain an accurate time reference without the need of an external reference for time. This PPS signal is used once main power is restored but no other reference is available. This PPS signal is more accurate than any other available reference.

In practical terms, existing RTC chips were not designed to interface to other oscillator inputs which is why this invention uses a programmable logic such as a CPLD. One advantage of the solution of the invention is that it does not require to modify the RTC chip, a very expensive task. The programmable logic can be built into the RTC chip or separately.

According to an aspect of the invention, the device has a processor configured to retrieve data indicating a time-of-day from the timing circuit and to set a new timestamp in the timing circuit.

According to an aspect of the invention, the device is one of a computing device, a laptop, a notebook computer, a PDA, a communication device, a mobile telephone, a GPS device, a Master Clock distributing Time/Frequency outputs, a PTP Master or NTP Server, a navigation device or any other battery-operated device.

According to an aspect of the invention, the high-precision oscillator is an Oven Controlled Crystal Oscillator (OCXO) or a temperature compensated Crystal Oscillator (TCXO) or a Micro Electro-Mechanical System (MEMS) type oscillator.

According to an aspect of the invention, the atomic clock is a rubidium atomic clock.

According to an aspect of the invention, the atomic clock or crystal oscillator 110 is a 10 MHz or other frequency oscillator.

According to an aspect of the invention, the logic device is discrete digital logic, a field programmable gate array (FPGA), an ASIC or a complex programmable logic device (CPLD).

According to an aspect of the invention, the time reference signal is a pulse per second (PPS) signal.

The invention also provides a real time clock integrated module for outputting data indicating a time-of-day and suitable for use in a device, said real time clock integrated module comprising:

a high-precision oscillator or atomic clock having an accuracy of 50 ppb (parts per billion) or better, a timing circuit for generating the time-of-day data according to a clock signal outputted from said high-precision oscillator or atomic clock, a power source for allowing the timing circuit (to maintain time when the device in which it is implemented is powered off, said timing circuit comprising a real time clock and a logic device storing a timestamp, said timing circuit being configured when the device is powered off to update the timestamp value based on the high-precision oscillator or atomic clock and to generate a time reference signal, said timing circuit being also configured to provide to the device said updated timestamp value and said time reference signal that the device can use as a time reference to reinitialize the timing system of the device once the device is powered up again.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which.

Throughout the drawings, it should be noted that like reference numbers are used to depict the same or similar elements, features and structures.

DETAILED DESCRIPTION

Figure 1:
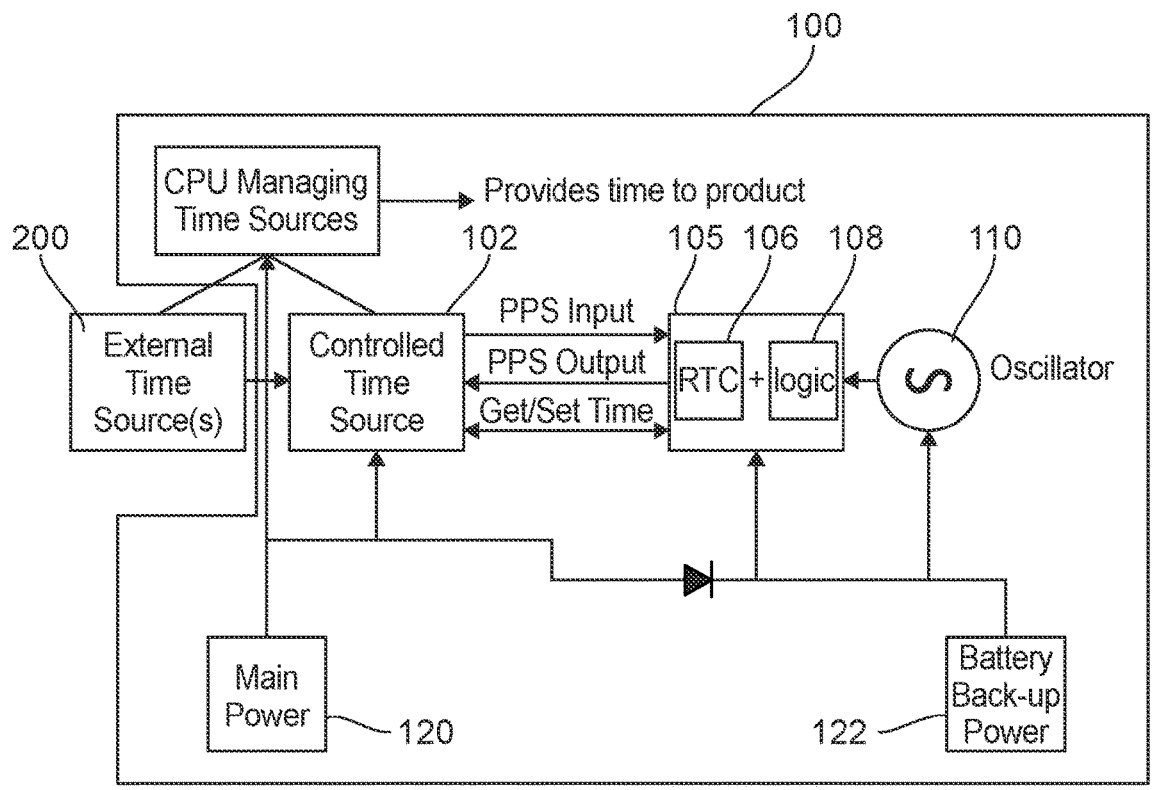
FIG. 1 is a block diagram illustrating a configuration of a device having a real time clock integrated circuit according to an exemplary embodiment of the present invention.

FIG. 1 is a block diagram illustrating a configuration of a device having a real time clock integrated circuit for outputting data indicating a time-of-day according to an exemplary embodiment of the present invention.

As schematically illustrated, the device or product 100 which may be a computing apparatus or a portable device, comprises a processing unit CPU (also named processor unit or main processor) which manages the time sources of the device or product 100 and provides time to the device or product 100.

The time sources of the device 100 may include one or more external time source(s) 200, though it is not required, and a controlled time source 102 provided by a master clock. In one particular embodiment, there is no external time source and only the Controlled Time Source 102 is the precise timekeeper.

The device or product 100 also comprises a real time clock (RTC) 106, a primary power source, also called main power, 120 that powers the device 100 and is a source of power for the controlled time source 102 when the device 100 is on.

The real time clock RTC 106 comprises input and output ports, registers, counters and memory.

In particular, the real time clock RTC 106 comprises date/time and sub-second time registers.

The real time clock RTC 106 is connected to a logic device 108 (a CPLD chip in that embodiment, though other logic devices may be used such as an ASIC) and a high-precision oscillator or atomic clock 110 such as Oven Controlled Crystal Oscillators (OCXO), forming a CPLD based real time clock circuit, also called CPLD based RTC or timing circuit 105.

The primary power source 120 provides power to the timing circuit 105 when the device 100 is on.

The high-precision oscillator or atomic clock 110 used as a clock source oscillates at an oscillation frequency and a clock signal outputs from the oscillator into the timing circuit 105, and more precisely into the logic device 108.

In this embodiment, the CPLD and real time clock RTC are each realized by using an individual IC.

In an alternative embodiment of the invention, the CPLD could be included in the real time clock RTC. In other words, the new logic contained in the CPLD could be built into the real time clock RTC chip. The CPLD and real time clock RTC forming the timing circuit 105 may thus be realized as a one-chip IC. The timing circuit 105 is backed by a battery source (battery back-up power) 122 that allows the timing circuit 105 to maintain time when the device 100 in which it is implemented is powered off, as will be explained below. The backup power source 122 is charged from the main power source 120, when the latter is available.

The logic device in the form of a CPLD 108 stores a timestamp, provided by the device 100, and updates that timestamp based on the precise oscillator or atomic clock 110 when the device 100 is off. The CPLD 108 also generates a pulse per second (PPS) signal that the device 100 can use as a time reference.

In other words, the disciplined reference oscillator or atomic clock 110 is designed to update the timestamp through the programmable logic device (a CPLD in this embodiment) and to reinitialize the timing system (controlled time source 102) of the device 100 with both time ("get/set time" arrow in FIG. 1) and the time reference signal PPS ("PPS output" arrow in FIG. 1) when requested by the timing system (controlled time source 102 and CPU) of the device 100.

The timing circuit 105 generates data indicating a time-of-day for the device 100, said data comprising an updated timestamp and a pulse per second (PPS) signal in that embodiment (other time reference signals may be used alternatively).

In this embodiment, the master time clock included in the controlled time source (or timing signal generation source) 102 may also maintain accurate time from an external reliable clock source 200, such as a GPS, GLONASS or Galileo satellite or other sources of precise time. It generates a pulse per second PPS signal with high precision which is provided to the timing circuit 105 (this is illustrated by the arrow "PPS input").

The timing circuit 105, which is powered by the battery (main power) 120 embedded in the device 100, keeps the time and includes an atomic clock or crystal oscillator 110 which may be referred to as a clock source that generates and provides an oscillating clock signal (CLK) with a clock frequency that provides the device reference time and typically provides clocking pulses which are distributed to most of the circuitry in the device 100. The atomic clock or crystal oscillator 110 is typically a 10 MHz oscillator. The accuracy of such an atomic clock or oscillator is 50 ppb (parts per billion) but an atomic clock or oscillator with a better accuracy may be used. The invention can be implemented with oscillators with other clock frequencies or the clock input to the invention can be scaled to other frequencies as needed by the digital logic.

The processing unit CPU of the device 100 is electrically coupled to the main power source 120. The device is able to provide power coming from the main power source 120 (battery) to the timing circuit 105, to retrieve the current time from the timing circuit 105 ("get time" arrow) and to set (synchronize) a new time in the timing circuit 105 ("set time" arrow).

The sending of data between the processing unit CPU and the timing circuit (CPLD based RTC) 105 is typically implemented using a Serial Peripheral Interface (SPI) for instance which is an interface bus commonly used to send data between microcontrollers and peripherals.

Within the timing circuit 105, an input end of the CPLD chip is connected with the high-precision crystal oscillator or atomic clock 110 and an output end of the CPLD chip is connected with the RTC 106 providing a pulse per second PPS signal to the main processing unit CPU (this is illustrated by the arrow "PPS output").

As mentioned previously, the backup power source 122 maintains operation of the timing circuit 105 when main power of the device is lost.

The CPLD 108 stores a timestamp, provided by the device 100 in which the real time clock integrated module is implemented, and updates that timestamp based on the precise oscillator or atomic clock 110. The CPLD 108 also generate a pulse per second (PPS) signal that the device 100 can use as a time reference when the device is powered on again. In that case, the processor CPU requests time from the timing circuit 105 when device is switched on again (this is illustrated by the arrow "PPS output"). System software stored in a memory coupled to the man processing unit CPU enables the latter to write and read timestamps into/from the CPLD 108 of the timing circuit 105.

The embodiment described implements a CPLD as a programmable logic element. However, programmable logic device/element encompasses all digital logic circuits that are configured by the end user, including field programmable gate arrays (FPGAs), ASICs and complex programmable logic devices (CPLDs). A programmable logic device (PLD) is a programmable integrated circuit that allows the user of the circuit, using software control, to program particular logic functions the circuit will perform. The user, in conjunction with software supplied by the manufacturer or created by the user or an affiliated source, can program the PLD to perform particular functions required by the user's application.

For the purpose of this description, it is to be understood that a programmable logic device refers to once programmable devices as well as reprogrammable devices. The logic element component (a CPLD in the embodiment described) is designed to implement control of the low power real-time clock (RTC) function, whereby the CPLD based RTC, also called timing circuit, is used to maintain accurate time from the moment that the main processing unit CPU loses main power until the time that it is restored. The logic element component (CPLD 108) uses a driver to control the RTC 106 by writing to its data and control registers. The logic element component (CPLD 108) holds a timestamp that is set by the main processor CPU. The main processor CPU enables this timestamp to count up once per second whose accuracy is determined by a time reference. In this reference implementation, a 10 MHz clock (oscillator or atomic clock 110) is used though other oscillator frequencies may be used.

The oscillator or atomic clock 110 issues periodic pulses that are communicated to the timestamp counter. The timestamp counter is operable to count the pulses. The output of the timestamp counter is incremented by a fixed amount at each pulse.

The main processor CPU maintains its own time using the same time reference as the timing circuit 105. The timestamp is updated with a new time when the device 100 goes into sync with a more accurate reference (external time source 200).

Once the main processor CPU loses main power, the timing circuit 105 continues to maintain the time reference to increment the timestamp using standby power (back-up power 122).

Once main power is restored to the main processor CPU, the main processor CPU requests time from the timing circuit 105. The timing circuit 105 provides the timestamp to the main processor CPU. In conjunction, the timing circuit 105 also provides a one Pulse Per Second (PPS) signal which is accurate to the time reference as well. This signal will provide sub-second roll over accuracy with which the main processor CPU can utilize to establish accurate timing.

In FIG. 1, the numerical references correspond to the following elements:
Device: 100
main power: 120
battery back-up power: 122
external time source(s): 200
controlled time source: 102
main processor: CPU
oscillator: 110
RTC: 106
Logic: 108
Timing circuit: 105

This invention supports three modes of operation for managing time in the timing circuit 105 implemented with a high-precision oscillator or atomic clock, i.e.:
1. Date and Time Setting mode
2. Date and Time Keeping mode
3. Date and Time Recovery mode These different modes of operation are now explained successively.

Date and Time Setting Mode of Operation

Figure 2:
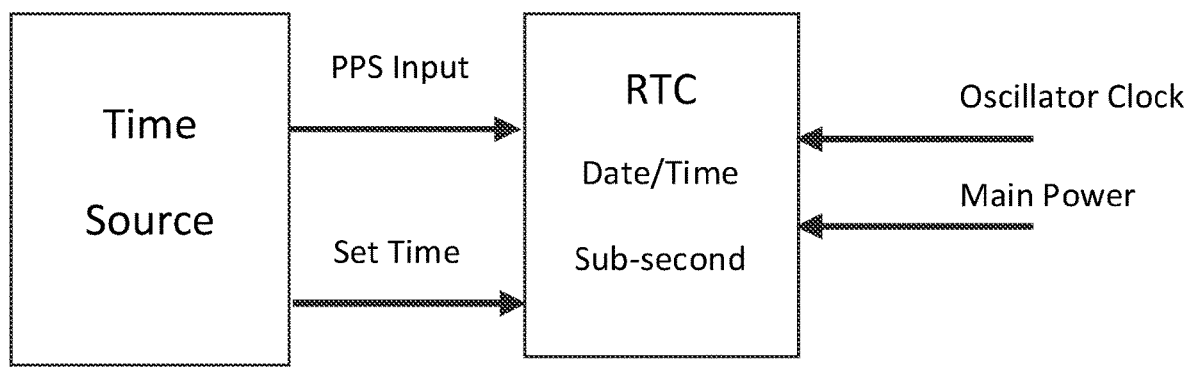
FIG. 2 is a block diagram illustrating the data flow of how the RTC time is set initially.

FIG. 2 is a block diagram illustrating the data flow of how the RTC time is set initially (Setting the RTC time).

Figure 3:
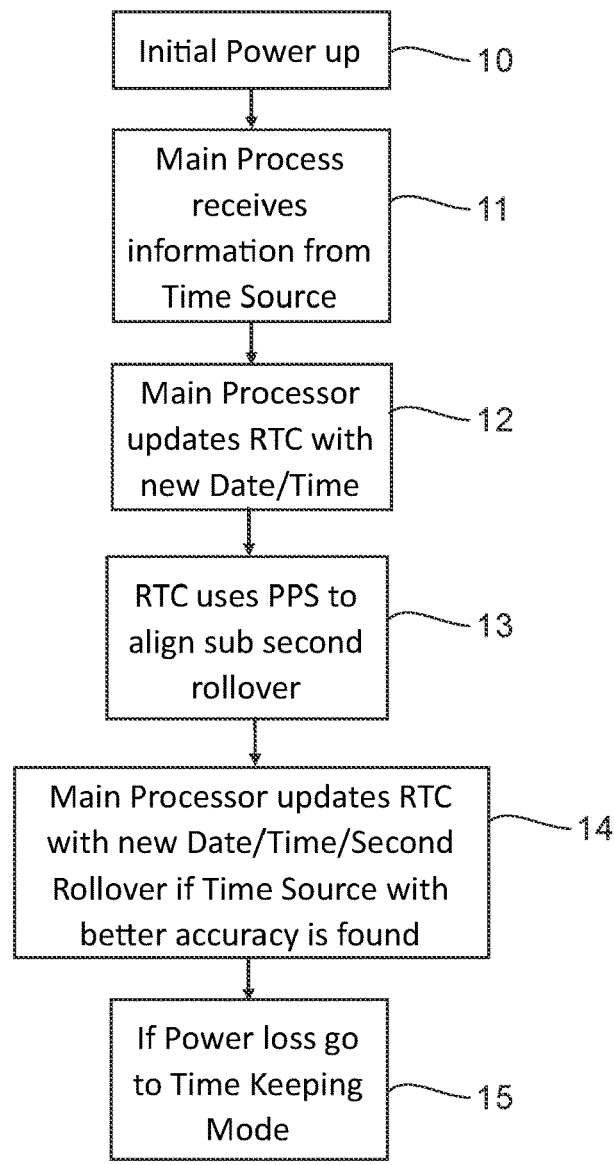
FIG. 3 is a flowchart showing a method of RTC operation from initialization until entering the Low Power Time Keeping mode.

FIG. 3 is a flowchart showing a method of RTC operation from initialization until entering the Low Power Time Keeping mode.

The real time clock RTC 106 comprises date/time and sub-second time registers.

The device or product 100 sets the real time clock RTC 106 date and time initially while it is running fully powered. The Date/Time values are stored by means of a counter which counts up time in seconds. The invention keeps fractional second time using a sub-second counter at a clock rate based on the frequency derived from the oscillator. Different implementations can measure sub-second times at different rates. The sub-second time and Date/Time counters are incremented using the precise oscillator or atomic clock frequency input as a counter.

The solution of the invention allows for the setting of date/time and the maintaining of accurate sub-second time in the real time clock RTC 106 by resetting these counters with an input pulse per second signal aligned to the UTC time (FIG. 2). When powering up the device using the solution of the invention, it allows the recovery of accurate date/time and sub-second time aligned to the precise second time by means of an output pulse per second signal generated at the start of each second by the precise counters. The accuracy of this output pulse is limited by the accuracy of the oscillator or atomic clock chosen. A TCXO, OCXO or even a Rubidium oscillator 110 can be used which provide increasing precise time for longer periods when the main power is removed.

The device or product 100 sets the Date/Time value and by means of a PPS (Pulse Per Second) input aligns the counting of seconds and also sub-second time to the time provided to the timing circuit by means of an accurate time source synchronized with the coordinated universal time (UTC) as illustrated schematically in FIG. 2. This time source can be any input such as a radio clock like GPS or GNSS (Galileo, Glonass, or Beidou), a terrestrial radio clock like WWVB, a wired input such as Ethernet IEEE 1588 PTP, IRIG AM, or another PPS input.

The timing circuit is synchronized to the date/time in the accurate time source and its update rate of seconds. The overall product or device can use the precise oscillator in a free-running mode or actively adjust its frequency to minimize frequency error and discipline it as a GPS disciplined oscillator to make the oscillator more stable and thus more accurate at timekeeping.

During the Date/Time setting phase, the value of date/time and/or the sub-second alignment to the time source's second rollover time can be transferred repeatedly to the counters in the real time clock RTC 106 using the precise oscillator or atomic clock 110. This is performed by writing the date/time value and by pulsing the PSS Pulse per second input. As the overall device/product's time source accuracy improves the stored times alignment can be more precisely synchronized.

In summary, the main successive date and time setting steps illustrated in FIG. 3 are as follows:
Step 10: initial power up
Step 11: main processor receives information from time source
Step 12: main processor updates RTC with new date/time
Step 13: RTC uses PPS to align sub-second rollover
Step 14: main processor updates RTC with new date/time/second rollover if a time source with better accuracy is found
Step 15: If power loss, go to the time keeping mode In addition, the time keeping rules detailed below apply in the device 100:
1. Update Date/Time if never done and Time Source is valid.
   a. Set Date/Time
   b. Pulse PPS input to RTC at second rollover to align time to the second rollover
2. Update Date/Time Time Source as accuracy improves.
   a. Set Date/Time
   b. Pulse PPS input to RTC at second rollover to align time to the second rollover
3. If Multiple time sources are supported and the time source changes, and it has better accuracy than the former time source.
   a. Set Date/Time
   b. Pulse PPS input to RTC at second rollover to align time to the second rollover
4. If Time source accuracy degrades, do not update.

The RTC Date/Time and sub-second accuracy increases in accuracy over time as time source(s) improve(s) in accuracy.

In summary, the advantages of implementing a CPLD based RTC is to:
Set the initial time from the external time reference initially
Maintain a more accurate time using a precision oscillator when in the power down mode
Provide the accurate time to the main processor when the power is back on
Zero out any accumulated time error in the RTC process when power is back on by synchronizing it to an external time source when one is available.

The use of the Pulse Per Second (PPS) inputs and outputs allows to set the CPLD based RTC (timing circuit 105) time very precisely aligning the second rollover to the time source standard which is typically UTC 1PPS from GPS Receivers.

Also, when the device 100 recovers time from the CPLD based RTC driven by the high precision oscillator or atomic clock 110, the PPS signal allows to transfer precise sub-second time to again restore the value of UTC time so the error is only the drift of the oscillator or atomic clock 110.

This allows recovery of precise time to sub-second values limited by the quality of the oscillator or atomic clock 110 which dictates its accumulated error due to initial frequency error and environmental conditions it experiences.

Power Interruption—Date and Time Keeping Mode of Operation

Figure 4:
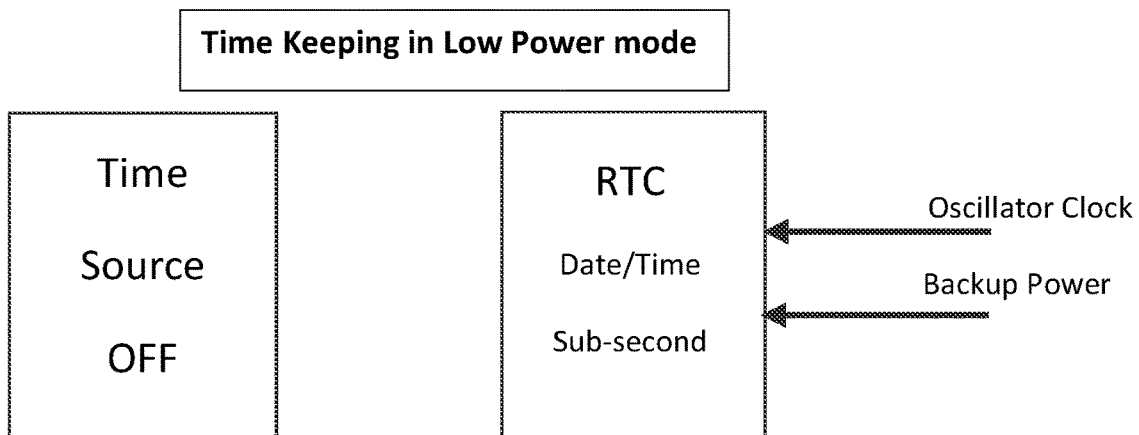
FIG. 4 is a block diagram illustrating the data flow when the device is in the Power Off mode and the RTC is operating in the Low Power Time Keeping mode from battery backup power.

FIG. 4 (entitled "Time keeping in low power mode") is a block diagram illustrating the data flow when the device is in the Power Off mode and the RTC is operating in the Low Power Time Keeping mode from battery backup power.

The device 100 in which the solution of the invention is used may have use cases which require it to operate in low-power mode or without the time-source 102.

The timing circuit 105 and time reference (oscillator or atomic clock 110) are backed by an external battery source 122 (standby power or backup power).

As mentioned previously, when the device 100 and the time source 102 are off because main power 120 is off, but battery backup 122 is available, the CPLD 108 maintains time by incrementing the timestamp and generating a PPS signal based on the time reference (oscillator or atomic clock 110) as schematically illustrated in FIG. 4.

In these cases, the real time clock RTC 106 using the precise oscillator 110 maintains time by running its counters. The accuracy in this mode is subject only to the drift of the high-precision oscillator or atomic clock 110 and its time without the time source 102. The longer the device 100 operates in this mode, the more the time accuracy and the PPS Pulse per second output's alignment to true time degrades. The rate of inaccuracy is dependent on the stability of the high-precision oscillator or atomic clock 110. The accurate pulse-per-second PPS signal is used to maintain integrity of the device's time reference as well as provide a mechanism to quickly obtain and maintain an accurate time reference without the need of an external reference for time. This PPS signal is used once main power is restored but no other reference is available. This PPS signal will be more accurate than any other available reference.

In the low power mode power, consumption is based on the high-precision oscillator or atomic clock 110 choice. Using modern OCXOs or atomic clocks, power consumption can be less than 0.4 W with accuracies at 50 ppb or better.

Date and Time Recovery Mode of Operation

Figure 5:
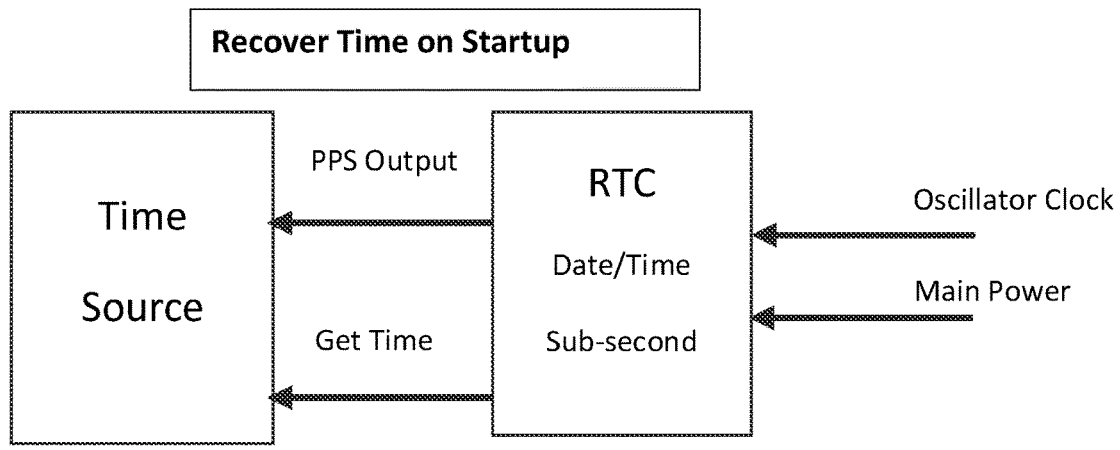
FIG. 5. Is a block diagram illustrating the data flow when the device is powered back on and is recovering time from the RTC.

FIG. 5. (entitled "recover time on startup") is a block diagram illustrating the data flow when the device is powered back on and is recovering time from the RTC.

The device 100 in which this invention is implemented has a use case in which it recovers or wakes from a low power state and its operation requires the date/time and/or alignment to sub-second time the time source 102 had provided previously.

The processor CPU is configured to switch from a low power state mode to an active mode.

The device on power-up will read the Date/Time from the RTC 106. As described previously, the Date/Time is maintained by the high-precision oscillator or atomic clock 110 in low power mode. The CPLD 108 provides the accurate time to the main processor CPU when the power is back on.

Once the device 100 is turned back on, the CPLD 108 provides an updated timestamp and accurate PPS signal, based on the accuracy of the accurate time reference (50 ppb or better), to the device.

The PPS output from the RTC 106 is used to align the second rollover time in the device 100 with original time-source's PPS pulse per second rollover time which results in sub-second accuracy related to the stability and frequency error of the oscillator and the time since the loss of PPS pulse input from the time source.

The PPS output from the RTC can be used to snap align the sub-second time to the RTC or to discipline and align the device to the sub-second time maintained in the RTC by the precise clock and counters made possible by the oscillator or atomic clock selected.

Now date/time and alignment to the second rollover time is recovered within the accuracy limits of the oscillator used.

Figure 6:
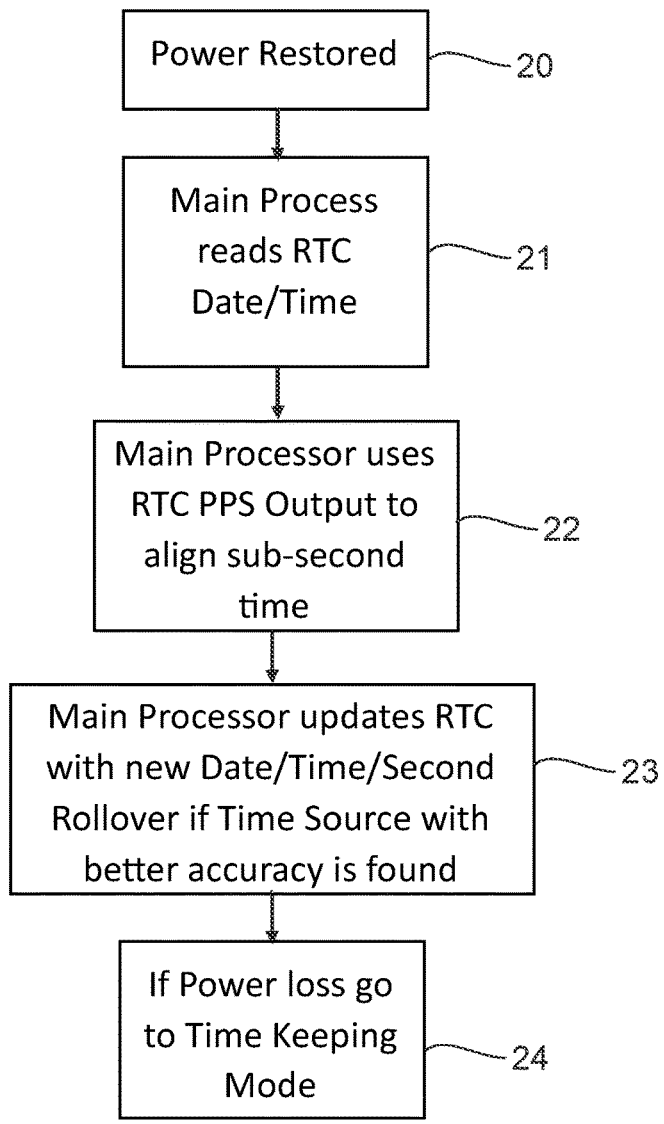
FIG. 6 is a flowchart showing a method of RTC operation for time recovery when power is restored.

The time recovery steps within the device 100 when power is restored are illustrated in FIG. 6 and are as follows:

Step 21: On device restart, i.e. when power is restored (step 20), the Date/Time is read by the main processing unit CPU from the RTC and restored Step 22: Every second the PPS is output from the RTC and input into the device's timekeeping, the main processing unit CPU uses the RTC PPS output to align sub-second time so the second rollover time matches the RTC.

Step 23: If a time source with better accuracy is found, return to time setting mode so that the main processing unit CPU updates the RTC with new date/time/second rollover.

Step 24: In case of power loss, go to time keeping mode described above.

The accuracy of the device Date/Time and second counting is now aligned to the RTC second update rate using the precise oscillator. This is aligned to the time source with error caused by drift incurred during the power-off period. The second rollover accuracy is now based on the precise oscillator error.

Applications

The solution of the invention may be implemented in communications, localization, aerospace, defense and similar applications which require frequency references with high stability and accuracy. It may be used in any system that can utilize a standby mode capability and requires very accurate time based on a high-performance crystal oscillator or atomic clock.

As an example, the invention may be implemented in distributed sensors which require correct Date/Time and synchronization to sub-second time to ensure coherent data collection over time and space.

It can also be used to synchronize two devices that in case of a power interruption would take time to realign without using the solution of the invention.

It may also be used in any device to maintain accurate time to secure another clock, in a time server or in a data center, or to provide precise time to cellular stations.

Any power source may be contemplated as the main power source, including a connection to a mains power supply or a USB connection, for example.

As shown in FIG. 1, the back-up power source 122 is a battery or a capacitor. The back-up power source is coupled to the main power via a diode. The diode and main power act as a charging circuit to charge the back-up power source when the voltage output by the main power is sufficiently high.

The device 100 may be a portable device, for example a computing device; a laptop; a notebook computer; a PDA; a communication device; a mobile telephone; a GPS device or a navigation device, or any other battery-operated device.

The device may be a Master Clock distributing Time/Frequency outputs, a PTP Master or NTP Server.

Figure 7:
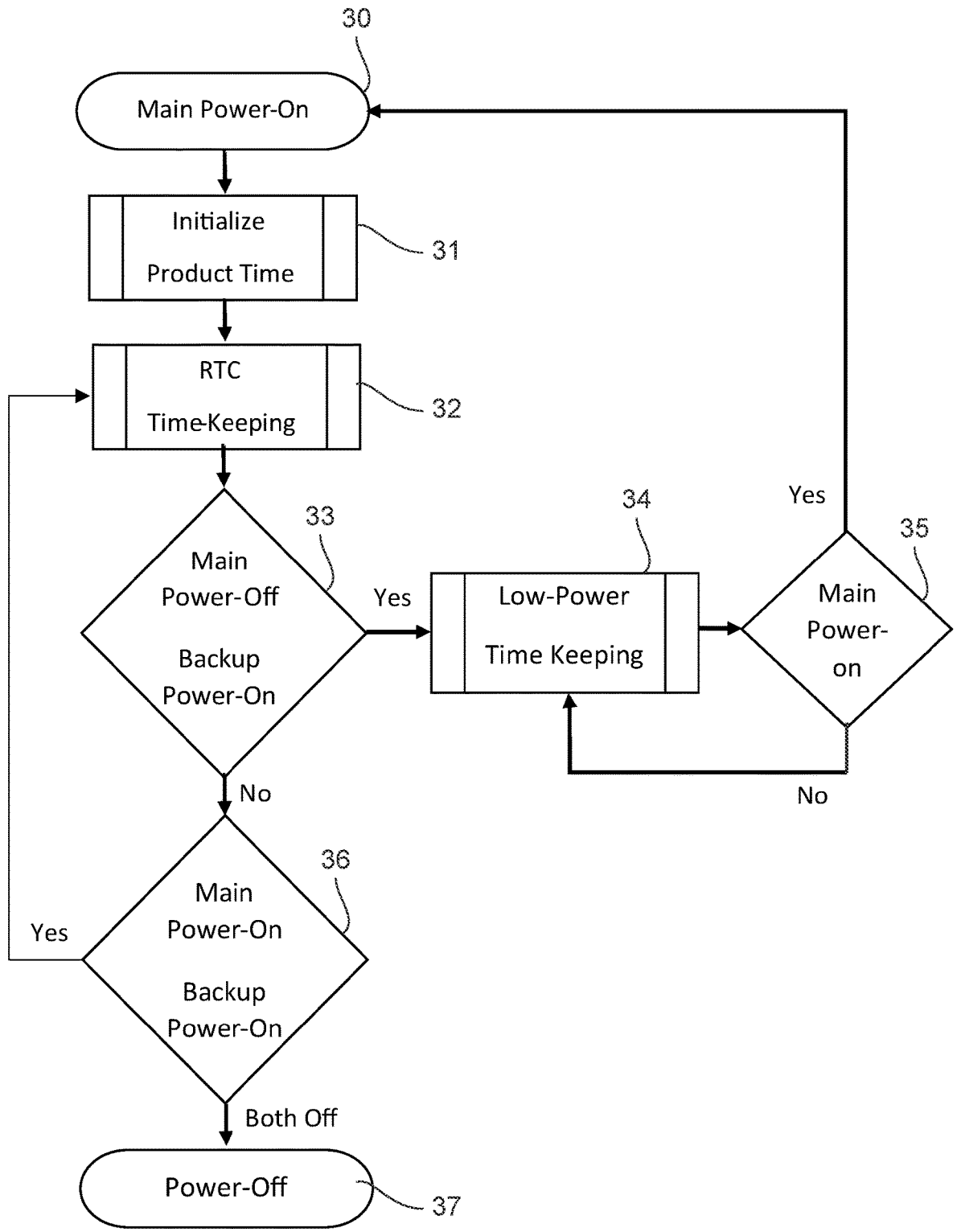
FIG. 7 is a flowchart showing a method of RTC operation for power state changes.

The flowchart illustrated in FIG. 7 below describes the modes of operation of the device 100 depending on whether main power 120 is on or off. When main power 120 is on (step 30) and once the time of the device 100 is initialized (step 31), time-keeping is controlled by the CPLD based RTC (timing circuit) at step 32. In case main power 120 is off (output "yes" at step 33) but back-up power 122 is available, low-power time-keeping is ensured by the CPLD based RTC (step 34) until main power 120 is switched on again (step 35). When both main power and back-up power are off (output "no" at step 33 and output "both off" at step 36), the device 100 does not operate anymore (power off at step 37). When both main power and back-up power are on (output "yes" at step 36), time-keeping is controlled by the CPLD based RTC (timing circuit) at step 32.

Figure 8:
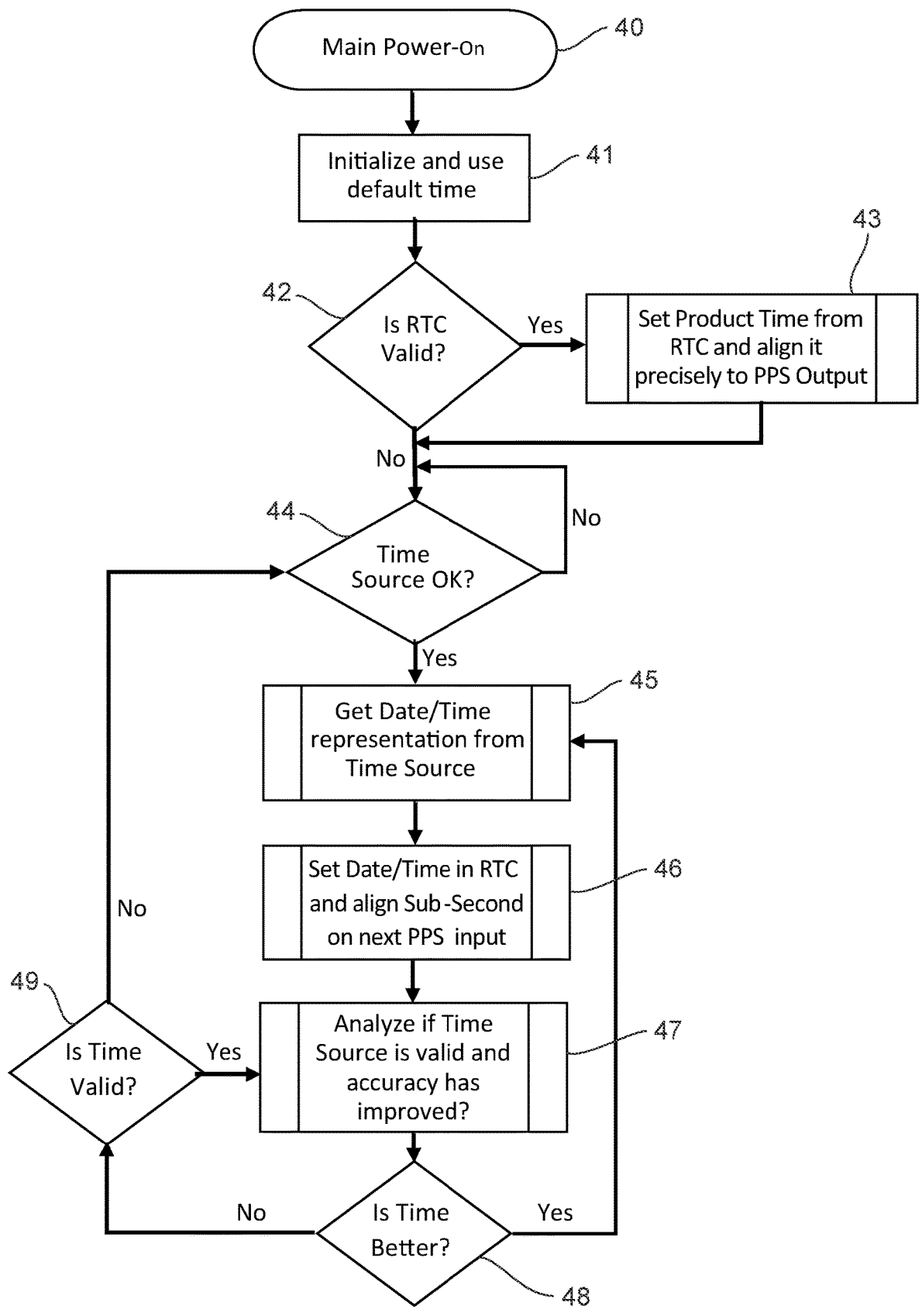
FIG. 8 is a flowchart showing a method of RTC operation for updating the time in the device and RTC when an accurate reference time is available.

The flowchart illustrated in FIG. 8 shows a method of RTC operation for updating of the time in the device and RTC when an accurate reference time is available.

Step 40: main power on
Step 41: initialize and use default time
Step 42: Is RTC valid?
If yes, set device time from RTC and align it precisely to PPS output (step 43)
If no, is time source OK? (step 44)
If no, step is re-iterated.
If yes, get date/time representation from time source (step 45).
Step 46: set date/time in RTC and align sub-second on next PPS input
Step 47: analyze if time source is valid and accuracy has improved
Step 48: is time better?
If yes, go back to step 45.
If no, is time valid? (step 49)
If yes, go to step 47. If no, go to step 44.

Figure 9:
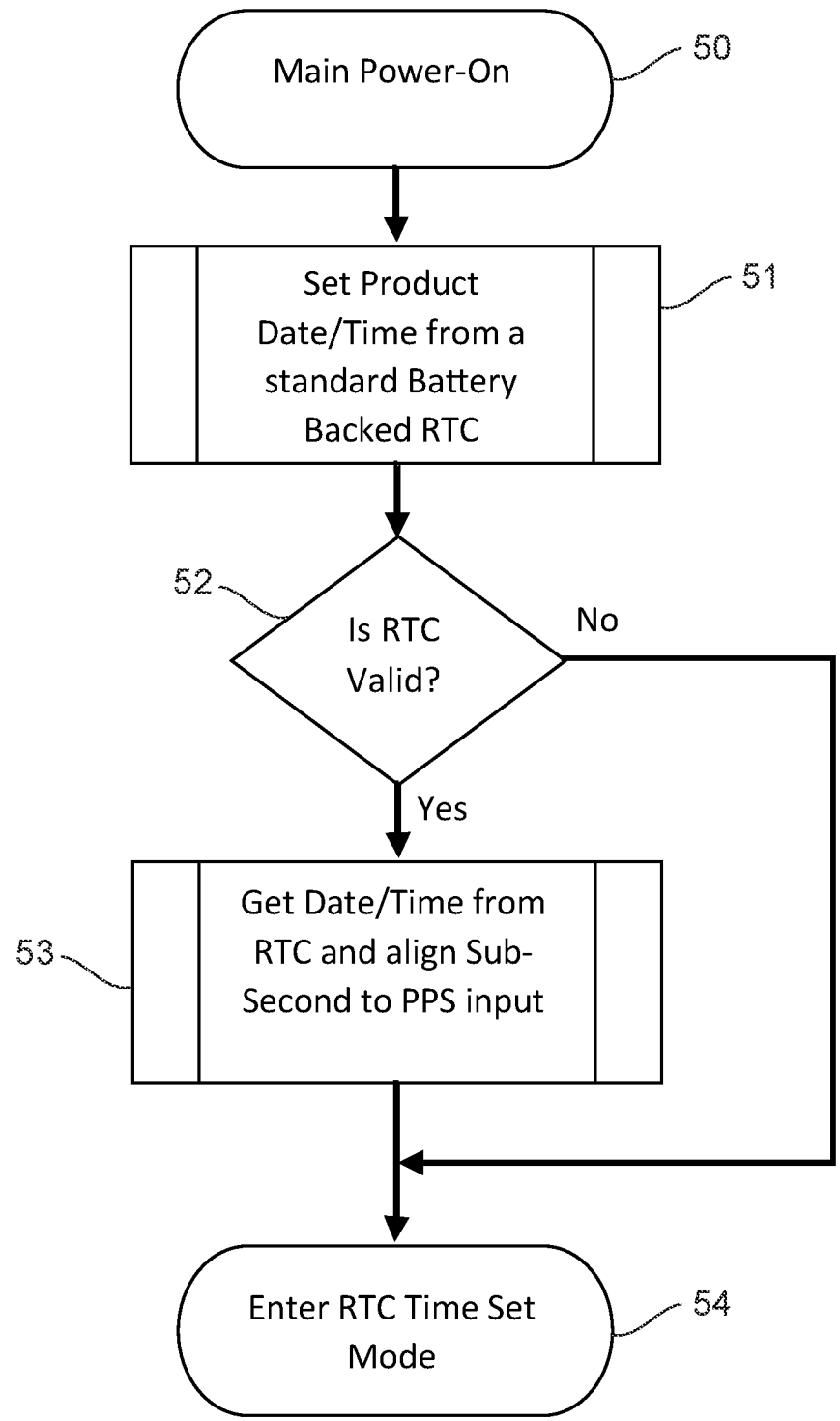
FIG. 9 is a flowchart showing a method of RTC operation for setting the date/time at power up.

The flowchart illustrated in FIG. 9 (entitled "startup date/time set) shows a method of RTC operation for setting the date/time of the device when first switched on (step 50). At step 51, the device date/time is set from a standard battery backed RTC. Then at step 52, it is determined whether RTC is valid. If no, the RTC time set mode is entered (step 54). If yes, the date/time from RTC is obtained and the subsecond is aligned to PPS output (step 53).

There is thus provided a device having a lower power operation and a solution to restore very accurate time when the device is powered on again.

The device has a timing circuit configured when the device is powered off to update a timestamp value based on a high-precision oscillator or atomic clock and to generate a time reference signal, the timing circuit being also configured to provide to the device said updated timestamp value and said time reference signal that the device can use as a time reference to reinitialize the timing system of the device once the device is powered up again.

In other words, it is proposed a disciplined oscillator timing system that can disciplined and put into a lower power state to store time/date, pps alignment and frequency. And at a later time be restored to high power state and retain nearly the same values except accuracy lost to oscillator drift.

The fact the timing system of the device as claimed keeps time/date like an RTC is not the main aspect. The fact that it can restore operation and begin to recover from this state to a more accurate state or deliver good function at this state now it has power applied as a Disciplined oscillator clocking system is the salient aspect.

Thanks to the invention as newly claimed, once power is restored, the timing system of the device resumes from closer to where it left off except for the loss of accuracy due to oscillator drift due to aging and environmental conditions. In other words, the invention quickly restores very accurate time. Normally, devices would require more time and a reference like GPS to be available to restore function.

The person skilled in the art trying to provide a solution to restore time in an quick and accurate manner when the device goes from a powered off state to a powered on state would find no hint in document D1, D2, D3 or D4 as how to modify D1 in order to lead to the claimed object.

The invention claimed is:

1. A device implementing a real time clock integrated module for outputting data indicating a time-of-day and suitable for use in the device, said real time clock integrated module comprising:
   a high-precision oscillator or atomic clock having an accuracy of 50 ppb (parts per billion) or better;
   a timing circuit configured to generate time-of-day data according to a clock signal outputted from said high-precision oscillator or atomic clock; and
   a primary power source or a connection for connecting to a primary power source to provide power to the timing circuit when the device is powered up; and
   a back-up power source configured to allow the timing circuit to maintain time when the device in which the real time clock integrated module is implemented is powered off;
   said timing circuit comprising a real time clock and a logic device storing a timestamp, said timing circuit being configured to, when the device is powered off, update the timestamp value based on the high-precision oscillator or atomic clock and generate a time reference signal, said timing circuit being also configured to provide to the device said updated timestamp value and said time reference signal that the device can use as a time reference to reinitialize a timing system of the device once the device is powered up again.

2. The device according to claim 1, the device comprising a processor configured to retrieve data indicating a time-of-day from the timing circuit and to set a new timestamp in the timing circuit.

3. The device according to claim 1 wherein the device is one of a computing device, a laptop, a notebook computer, a PDA, a communication device, a mobile telephone, a GPS device, a Master Clock distributing Time/Frequency outputs, a PTP Master or NTP Server, a navigation device or any other battery-operated device.

4. The device according to claim 1, wherein the real time clock integrated module comprises the high-precision oscillator and the high-precision oscillator is an Oven Controlled Crystal Oscillator (OCXO) or a temperature compensated Crystal Oscillator (TCXO) or a Micro Electro-Mechanical System (MEMS) type oscillator.

5. The device according to claim 1, wherein the real time clock integrated module comprises the atomic clock and the atomic clock is a rubidium atomic clock.

6. The device according to claim 1, wherein the atomic clock or oscillator is a 10 MHz oscillator.

7. The device according to claim 1, wherein the logic device is discrete digital logic, a field programmable gate array (FPGA), an ASIC or a complex programmable logic device (CPLD).

8. The device according to claim 1, wherein the time reference signal is a pulse per second (PPS) signal.

9. A real time clock integrated module for outputting data indicating a time-of-day and suitable for use in a device, said real time clock integrated module comprising:
   a high-precision oscillator or atomic clock having an accuracy of 50 ppb (parts per billion) or better;

a timing circuit configured to generate time-of-day data according to a clock signal outputted from said high-precision oscillator or atomic clock; and a primary power source or a connection for connecting to a primary power source to provide power to the timing circuit when the device is powered up; and a back-up power source configured to allow the timing circuit to maintain time when the device in which the real time clock integrated module is implemented is powered off, said timing circuit comprising a real time clock and a logic device storing a timestamp, said timing circuit being configured to, when the device is powered off, update the timestamp value based on the high-precision oscillator or atomic clock and generate a time reference signal, said timing circuit being also configured to provide to the device said updated timestamp value and said time reference signal that the device can use as a time reference to reinitialize a timing system of the device once the device is powered up again.

\* \* \* \* \*